Dec. 11, 1951    S. WALD ET AL    2,578,385
VOLTAGE REGULATOR
Filed June 30, 1948

Inventors
Sidney Wald &
Ted E. Dunn
By
Morris L. Kahn
Attorney

Patented Dec. 11, 1951

2,578,385

UNITED STATES PATENT OFFICE 2,578,385

VOLTAGE REGULATOR

Sidney Wald, Collingswood, and Ted E. Dunn, Pennsauken, N. J., assignors to Radio Corporation of America, a corporation of Delaware Application June 30, 1948, Serial No. 36,223

16 Claims. (Cl. 318—343)

This invention relates to improvements in voltage regulators, and more particularly to the regulation of electric motors, motor-generators such as dynamotors, and the like.

A well known and widely used type of motor-generator is the so-called dynamotor, in which a motor armature and a generator are mounted on a common shaft and provided with a common field winding. The dynamotor may be considered as a D. C. voltage transformer, and is commonly used for supplying high D. C. voltage from a low voltage source. In many instances, the supply voltage for the dynamotor may vary considerably, making it difficult to hold the voltage output of the dynamotor at a predetermined level, and while various means for maintaining a constant voltage have been proposed, such means have generally been unsuitable for one reason or another.

Similar considerations apply to D. C. motors which may be required to run at a constant speed with changing load and/or changes in input voltage.

Accordingly, it is a general object of the present invention to provide improved means for regulating the voltage of an electric motor, or a motor-generator.

Another object is to provide an improved means for stabilizing the input voltage to a motor or motor-generator.

A further object is to provide means to compensate for changes in input voltage or load with a motor or motor-generator.

According to the invention, the foregoing and other objects and advantages are attained by means of an auxiliary electric machine, the armature of which is coupled to the shaft of the machine to be regulated. The armature of the auxiliary machine is connected in series with the motor armature of the machine to be regulated, and means are provided for controlling the field of the auxiliary machine so that the voltage across the armature of the auxiliary will vary automatically to maintain a constant input voltage to the motor armature of the regulated machine, even though the supply voltage for the system and/or the load on the system may be varying within relatively wide limits.

Figure 1:
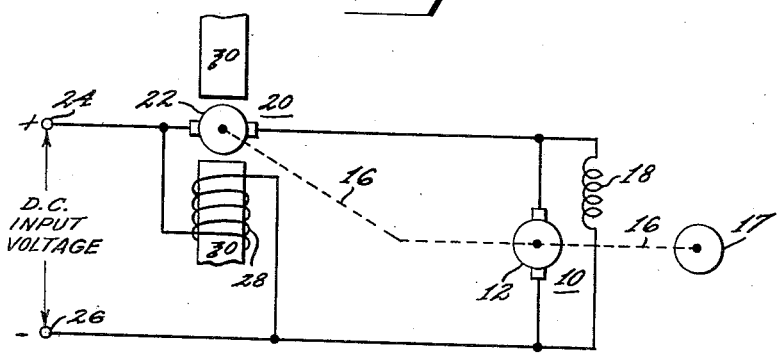
Figure 2:
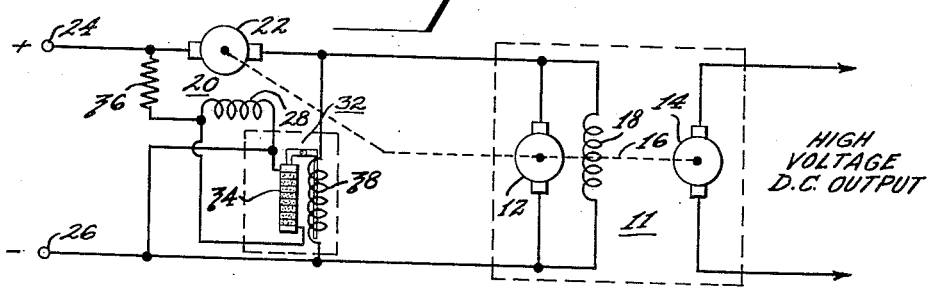
Figure 3:
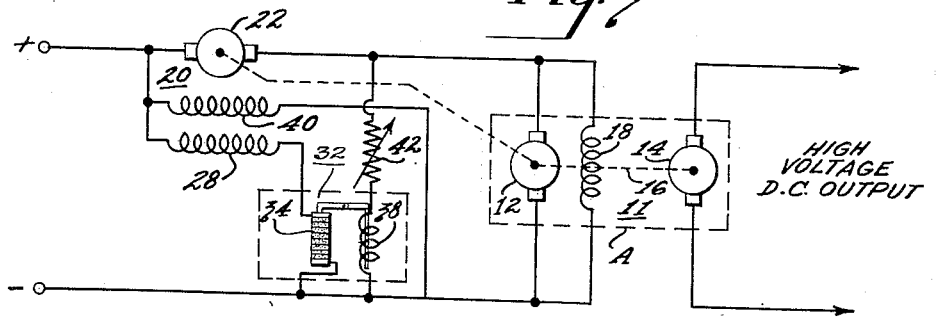

A more complete understanding of the invention may be had by reference to the following description of illustrative embodiments thereof when considered in connection with the accompanying drawings, in which:

Figure 1 shows a motor provided with an auxiliary regulating machine arranged in accordance with the invention, Figure 2 shows a modified arrangement of the circuit of Figure 1, as applied to a dynamotor, and Figure 3 shows a further modification of the circuit of Figure 1, as applied to a dynamotor.

For the purpose of simple disclosure, the invention will be described as applied to a D. C. motor, and/or a dynamotor, although it will be apparent to those skilled in the art that the principles of the invention are equally applicable to other similar types of electrical machinery. Accordingly, there is shown in Figure 1, a motor 10 having an armature 12 with a shaft 16 connected to a load device 17 of any suitable kind. A field winding 18 is provided in shunt with the motor armature 12 in the usual manner. In the ordinary case, a D. C. voltage would be supplied to the motor armature 12 and field winding 18, causing the motor 10 to run at some predetermined speed. However, if the voltage supplied to the motor should vary then the speed of the motor would also vary. Regulation is therefore provided, in accordance with the invention, by an auxiliary electric machine 20 having an armature 22 mounted on the shaft 16 or otherwise mechanically linked to the motor armature 12, and connected in series with the armature of the motor 10 and one terminal 24 of a pair of input terminals 24, 26, through which a D. C. voltage from a suitable source (not shown) may be supplied to the system. The auxiliary machine 20 is also provided with a field winding 28 connected across the input terminals 24, 26, and with a permanent field magnet 30. The magnet 30 is so polarized as to establish a magnetic field for the auxiliary machine which will be in a direction opposite to the magnetic field which will be established by current through the field winding 28.

The system shown in Figure 1 operates in the following manner:

The strength of the permanent magnet 30 is made such that normal current through the field winding 28, corresponding to the desired input voltage for the system, will produce a magnetic field of sufficient strength to exactly cancel the field due to the permanent magnet 30. Accordingly, as long as the voltage at the input terminals 24, 26 remains at the desired level, the auxiliary machine 20 will have no effective magnetic field through its armature 22, and no voltage will be developed by the machine 20. However, if the input voltage at the terminals 24, 26 should decrease, the current through the auxiliary field winding 28 also will decrease, and the magnetic field of the permanent magnet 30 will then be greater than the field due to the current through the field winding 28. As a result, a voltage will be generated by the auxiliary machine 20 in such a direction as to aid the input voltage, and the voltage across the armature 12 of the motor 10 will be held at the desired level. If, on the other hand, the input voltage should rise above the desired level, the current through the field winding 28 will increase, and the magnetic field due to current through the field winding 28 will then be greater than the field of the permanent magnet 30. As a result, a voltage will be developed across the armature 22 of the auxiliary machine 20 which will be in such a direction as to oppose the input voltage. As before, the input voltage across the armature 12 of the motor 10 will be held at the desired level. Hence, the auxiliary machine 20 will automatically compensate for changes in the input voltage to the system, and the speed of the motor 10 will remain constant.

The auxiliary machine 20 may also be arranged to regulate both for changes in the supply voltage and for changes in the load on an electric machine. In order to illustrate the applicability of the principles of the invention to types of rotary electric machines other than motors the circuits of Figure 2 and Figure 3 are shown and described in conjunction with dynamotors, although it will be appreciated that control circuits of the types shown in Figures 2 and 3 could be used with motors, and that control circuits of the type shown in Figure 1 could be used with motor-generators. Referring first to Figure 2, within the broken line block A there is shown a dynamotor 11 having a motor armature 12 and a generator armature 14 mounted on a common shaft 16. A common field winding 18 is provided in shunt with the motor armature 12 in the usual manner. In the arrangement shown in Figure 2, a single magnetic field is established for the auxiliary machine 20 by a field winding 28, so that a voltage will always be produced by the machine 20. The magnitude of the voltage generated by the machine 20 will be determined by the condition of a solenoid-controlled carbon pile regulator 32 for the field winding 28 of the auxiliary machine 20. The carbon pile resistance element 34 of the regulator 32 is connected in parallel with the field winding 28 of the auxiliary machine and the parallel combination of the resistance element 34 and the field winding 28 is connected across the input terminals 24, 26 in series with a dropping resistor 36. The solenoid control-element 38 of the regulator 32 is connected across the motor armature 12 of the dynamotor 11 as to be sensitive to changes in voltage across this armature. The system of Figure 2 is so arranged that the voltage generated by the auxiliary machine 20 will be of the proper magnitude, when added to the normal supply voltage at the input terminals 24, 26, to maintain the proper voltage across the motor armature 12 of the dynamotor 11. If the voltage across the motor armature 12 tends to increase, either due to a change in input voltage, or due to a change in the load on the dynamotor, then the resulting increased current through the solenoid 38 will be effective to decrease the resistance of the carbon pile resistor 34, and as a result the current through the field winding 28 will decrease, causing a decrease in the output voltage of the auxiliary machine 20. On the other hand, if the voltage across the motor armature 12 of the dynamotor should tend to decrease for any reason, then the current through the solenoid 38 will also decrease, tending to increase the resistance of the carbon pile resistor 34. As a result, the current through the field winding 28 will increase, and the voltage output of the auxiliary machine 20 will also tend to increase, compensating for the original voltage decrease across the motor armature 24. The circuit of Figure 2 could as well be arranged with the field winding 28 in series with the resistor element 34 of the carbon pile regulator rather than in parallel as is shown. In such case, the solenoid 38 would be arranged so that increased voltage across the solenoid would tend to produce an increased resistance in the carbon pile resistor 34. However, the circuit of Figure 2 is considered preferable, as a carbon pile regulator element 32 of the type shown and described is more readily available than that mentioned for use with a series connection of the field winding 28 and resistor element 34.

Referring, next, to Figure 3, in this modification of the invention the auxiliary machine 20 is provided with a pair of oppositely wound field windings 28 and 40 connected across the input voltage supply leads. In this modification, a series connection of one field winding and the resistor element of a regulator identical to the regulator used in Figure 2 is permissible as will appear hereinafter. Accordingly, a carbon pile regulator 32 is connected in the circuit with its resistance element 34 in series with one of the field windings 28, and with its solenoid control element 38 connected across the terminals of the motor armature 12, in series with a variable resistor 42 which may be used for adjusting the voltage output of the system. In this modification, the mode of operation represents a combination of some of the features of the circuits of Figures 1 and 2. In Figure 3, the oppositely wound field windings 28 and 40 correspond generally to the field winding 28 and the permanent magnet 30 of Figure 1, in that, when the voltage across the input terminals is equal to the desired voltage at the terminals of the motor armature 12, the currents flowing through the field windings 28 and 40 will produce magnetic fields which are equal and opposite to each other, and as a result no voltage will be produced by the auxiliary machine. However, if the voltage across the motor armature 12 of the dynamotor 11 should increase due to a change in input voltage at the terminals 24, 26 or due to a change in the load on the dynamotor, then the current, through the control solenoid 38 will increase, tending to decrease the resistance of the carbon pile resistor 32, and as a result the current through the field winding 28 will increase, producing a greater magnetic field than is generated by the current flowing in the field winding 40. A voltage will then be produced by the auxiliary machine 20 which opposes the voltage at the input terminals 24, 26, and the voltage across the motor armature 12 will be held at the desired value. If the voltage across the motor armature 12 tends to decrease for any reason, then the current through the control solenoid 38 will decrease, tending to increase the resistance of the carbon pile resistor 34, and with the corresponding decrease in current through the winding 28, the field due to the field winding 40 will be greater than the field due to the field winding 28. As a result, a voltage will be generated by the auxiliary motor 20 in such a direction as to add to the input voltage at the terminals 24, 26, and the voltage to the dynamotor 11 will again be held at the desired level. The variable resistor 42 may be adjusted to give the desired output voltage from the dynamotor within reasonable limits.

Thus in all of the circuits shown and described, effective regulation of output voltage is attained with variable input supply voltage. In the case of the circuit of Figure 1, this regulation is direct, because the control circuit is connected directly across the input terminals 24, 26, while in the circuits of Figures 2 and 3 the regulation is reflected back from the motor armature. In addition, the circuits of Figures 2 and 3 provide regulation with changing loads.

Other changes could be made in the circuits shown, in addition to those already mentioned, as, for example, the substitution of other types of current control elements for the carbon pile regulators 32. Since many such changes and modifications could be made within the scope and spirit of the invention, the foregoing is to be construed as illustrative and not in a limiting sense.

What is claimed is:

1. In a device of the type described including an electric machine having (1) input terminals adapted to be connected to a source of voltage, and (2) a motor armature, in combination, an auxiliary electric machine having an armature and means including a field winding for establishing a magnetic field for said auxiliary machine, said last named armature being mechanically coupled to said motor armature and being connected in series with said motor armature and one of said input terminals between said motor armature and said one terminal, and means including said field winding for regulating the magnetic field for said auxiliary machine in response to variations in the voltage across said motor armature.

2. In a device of the type described including a motor-generator having (1) input terminals adapted to be connected to a source of voltage, (2) a motor armature, and (3) a generator armature mechanically coupled to said motor armature, in combination an auxiliary electric machine having an armature and means for establishing opposed magnetic fields for said machine including at least one field winding for said machine, said last named armature being mechanically coupled to said motor and generator armatures and being connected in series with said motor armature and one of said input terminals between said motor armature and said one terminal, and means including said field winding for regulating the resultant of the opposed magnetic fields for said machine in accordance with variations in the voltage across said motor armature.

3. In a device of the type described including a dynamotor having (1) input terminals adapted to be connected to a source of voltage and (2) motor and generator armatures mounted on a common shaft, the combination of an auxiliary electric machine having an armature and means including a field winding for establishing a magnetic field for said machine, said last named structure being mounted on said common shaft and being connected in series with said motor armature and one of said input terminals between said motor armature and said one terminal, and means including said field winding for varying the magnetic field for said machine in response to variations in the voltage across said motor armature.

4. In a device of the type described including an electric machine having (1) input terminals adapted to be connected to a source of voltage and (2) a motor armature, the combination of an auxiliary electric machine having an armature and means for establishing opposed magnetic fields for said auxiliary machine including at least one field winding for said auxiliary machine, said last named armature being mechanically coupled to said motor armature and being connected in series with said motor armature and one of said input terminals between said motor armture and said one terminal, and means including said field winding for varying the resultant of the opposed magnetic fields for said auxiliary machine in accordance with variations in the voltage across said motor armature.

5. In a device of the type described including an electric machine having (1) input terminals adapted to be connected to a source of voltage and (2) a motor armature, the combination of an auxiliary electric machine having an armature and means including at least one field winding for establishing a magnetic field for said machine, said last named armature being mechanically coupled to said motor armature and being connected in series with said motor armature and one of said input terminals between said motor armature and said one terminal, and means for regulating the current through said field winding in response to variations in the voltage across said motor armature.

6. In a device of the type described including a dynamotor having (1) input terminals adapted to be connected to a source of voltage and (2) motor and generator armatures mounted on a common shaft, the combination of an auxiliary electric machine having an armature and means including at least one field winding for establishing a magnetic field for said machine, said last named armature being mounted on said common shaft and being connected in series with said motor armature and one of said input terminals between said motor armature and said one terminal, and regulating means for said auxiliary machine including (1) a current regulator in circuit with said field winding and (2) means for controlling said regulator in accordance with the voltage supplied to said motor-generator from said source.

7. In a device of the type described including a dynamotor having (1) input terminals adapted to be connected to a source of voltage and (2) motor and generator armatures mounted on a common shaft, the combination of an auxiliary electric machine having an armature and means including at least one field winding for establishing a magnetic field for said machine, said last named armature being mounted on said common shaft and being connected in series with said motor armature and one of said input terminals between said motor armature and said one terminal, and a regulating device including (1) a current regulator in circuit with said field winding and (2) a voltage responsive control element for said regulator connected in parallel with said motor armature.

8. In a device of the type described including a dynamotor having (1) input terminals adapted to be connected to a source of voltage and (2) motor and generator armatures mounted on a common shaft, the combination of an auxiliary electric machine having an armature and means including at least one field winding for establishing a magnetic field for said machine, said last named armature being mounted on said common shaft and being connected in series with said motor armature and one of said input terminals between said motor armature and said one terminal, and current regulating means including (1) a variable resistance element in circuit with said field winding and (2) means for varying the resistance of said element in accordance with variations in the voltage across said motor armature.

9. In a device of the type described including a dynamotor having (1) input terminals adapted to be connected to a source of voltage and (2) motor and generator armatures mounted on a common shaft, the combination of an auxiliary electric machine having an armature and means including at least one field winding for establishing a magnetic field for said machine, said last named armature being mounted on said common shaft and being connected in series with said motor armature and one of said input terminals between said motor armature and said one terminal, and current regulating means including (1) a variable resistance element in parallel with said field winding and (2) means for varying the resistance of said element in accordance with variations in the voltage across said motor armature.

10. In a device of the type described including a dynamotor having (1) input terminals adapted to be connected to a source of voltage and (2) motor and generator armatures mounted on a common shaft, the combination of an auxiliary electric machine having an armature and means including at least one field winding for establishing a magnetic field for said machine, said last named armature being mounted on said common shaft and being connected in series with said motor armature and one of said input terminals between said motor armature and said one terminal, and a current regulating device including a carbon-pile resistor and a solenoid control element for varying the resistance of said carbon pile resistor, said carbon pile resistor being connected in circuit with said field winding, and said solenoid control element being connected in parallel with said motor armature.

11. In a device of the type described including a dynamotor having (1) input terminals adapted to be connected to a source of voltage and (2) motor and generator armatures mounted on a common shaft, the combination of an auxiliary electric machine having an armature and means including at least one field winding for establishing a magnetic field for said machine, said last named armature being mounted on said common shaft and being connected in series with said motor armature and one of said input terminals between said motor armature and said one terminal, and a current regulating device including a carbon-pile resistor and a solenoid control element for varying the resistance of said carbon pile resistor, said carbon pile resistor being connected in parallel with said field winding, and said solenoid control element being connected in parallel with said motor armature.

12. In a device of the type described including a dynamotor having (1) input terminals adapted to be connected to a source of voltage and (2) motor and generator armatures mounted on a common shaft, the combination of an auxiliary electric machine having an armature and two field windings wound in opposite directions, said last named armature being mounted on said common shaft and being connected in series with said motor armature and one of said input terminals between said motor armature and said one terminal, and means for regulating the current through one of said field windings in accordance with the voltage across said motor armature.

13. In a device of the type described including a dynamotor having (1) input terminals adapted to be connected to a source of voltage and (2) motor and generator armatures mounted on a common shaft, the combination of an auxiliary electric machine having an armature and two field windings wound in opposite directions, said last named armature being mounted on said common shaft and being connected in series with said motor armature and one of said input terminals between said motor armature and said one terminal, and a regulating device including (1) a current regulator in circuit with one of said field windings and (2) a voltage responsive control element connected in parallel with said motor armature for controlling the operation of said regulator.

14. In a device of the type described including a dynamotor having (1) input terminals adapted to be connected to a source of voltage and (2) motor and generator armatures mounted on a common shaft, the combination of an auxiliary electric machine having an armature and two field windings wound in opposite directions, said last named armature being mounted on said common shaft and being connected in series with said motor armature and one of said input terminals between said motor armature and said one terminal, and regulating means for said auxiliary machine including (1) a current regulator in circuit with one of said field windings and (2) means for controlling said regulator in accordance with the voltage supplied to said dynamotor from said source.

15. In a device of the type described including a dynamotor having (1) input terminals adapted to be connected to a source of voltage and (2) motor and generator armatures mounted on a common shaft, the combination of an auxiliary electric machine having an armature and two field windings wound in opposite directions, said last named armature being mounted on said common shaft and being connected in series with said motor armature and one of said input terminals between said motor armature and said one terminal, and current regulating means including (1) a variable resistance element in series with one of said field windings and (2) means for varying the resistance of said element in accordance with variations in the voltage across said motor armature.

16. In a device of the type described including a dynamotor having (1) input terminals adapted to be connected to a source of voltage and (2) motor and generator armatures mounted on a common shaft, the combination of an auxiliary electric machine having an armature and two field windings wound in opposite directions, said last named armature being mounted on said common shaft and being connected in series with said motor armature and one of said input terminals, and current regulating means including (1) a variable resistance element in circuit with said field winding and (2) means for varying the resistance of said element in accordance with variations in the voltage across said motor armature.

SIDNEY WALD.
TED E. DUNN.

REFERENCES CITED

The following references are of record in the file of this patent:

UNITED STATES PATENTS

| Number | Name | Date |
| --- | --- | --- |
| 1,071,522 | Kramer | Aug. 26, 1913 |
| 1,137,121 | Creveling | Apr. 27, 1915 |
| 1,553,104 | Pollock | Sept. 8, 1925 |